March 15, 1949.  H. R. ZARRS  2,464,542

FLY TIER'S BOBBIN

Filed July 15, 1946

Inventor
H. R. Zarrs
By Hazard and Miller
Attorneys

Patented Mar. 15, 1949

2,464,542

UNITED STATES PATENT OFFICE 2,464,542

FLY TIER'S BOBBIN

Hobert R. Zarrs, Glendale, Calif.

Application July 15, 1946, Serial No. 683,760

2 Claims. (Cl. 242—140)

This invention relates to a fly tier's bobbin or to a device which will facilitate the winding and tying of thread in tying flies or artificial fish lures.

An object of the invention is to provide a bobbin adapted to receive a spool of thread the free end of which may be withdrawn from the spool and wherein provision is made for imposing a frictional resistance or drag on the spool so that in the course of tying flies and similar fish lures the withdrawn thread will be withdrawn under adequate tension to cause the thread to be tightly wound or tied about the lure.

More specifically an object of the invention is to provide a fly tier's bobbin consisting of an elongated body one end of which is pointed and the other end of which is recessed to provide a chamber adapted to receive a spool of thread, the free end of which is led or guided to the point. Within the recess there is provided means for adjustably imposing a resistance on the spool so as to resist its rotation and cause the withdrawn portion of the thread to be withdrawn under tension. This resistance may be maintained substantially constant by reason of the adjustment and is normally adequate to prevent rotation of the spool entirely if the bobbin is merely suspended from the withdrawn portion of the thread. There are many situations in the course of tying flies and similar fish lures wherein it is desired to temporarily interrupt the tying or winding of the thread and have the wound portion retained under constant tension. Under these circumstances by means of the present construction the bobbin may be merely dropped and allowed to remain suspended from the partially tied fly to maintain the tension and if the weight of the bobbin is insufficient to overcome the resistance to rotation of the spool further unwinding of the spool will not take place.

A further object of the invention is to provide a fly tier's bobbin which is of relatively simple and durable construction and which can be economically manufactured and which can be conveniently handled in tying flies.

With the foregoing and other objects in view, which will be made manifest in the following detailed description and specifically pointed out in the appended claims, reference is had to the accompanying drawings for an illustrative embodiment of the invention, wherein:

Figure 1:
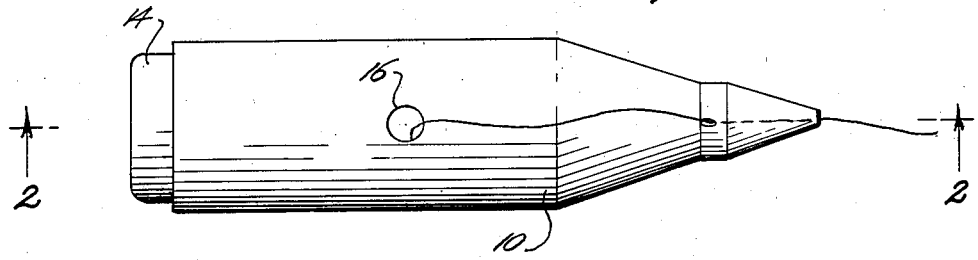
Figure 1 is a top plan view of the fly tier's bobbin embodying the present invention.
Figure 2:
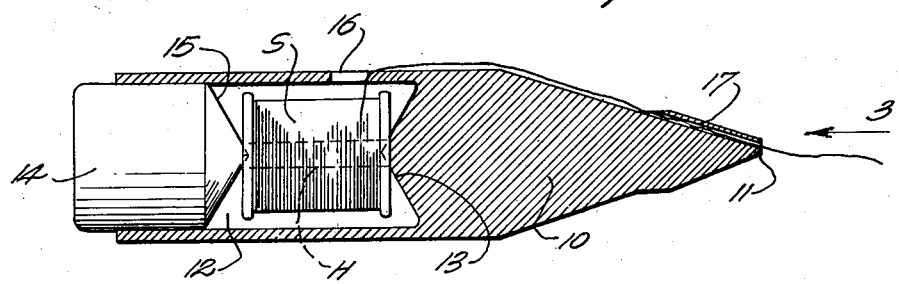
Fig. 2 is a longitudinal vertical section through the same and may be regarded as taken substantially upon the line 2—2 upon Fig. 1 in the direction indicated.
Figure 3:
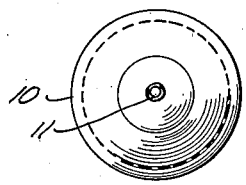
Fig. 3 is an end view of the pointed end of the bobbin.

Referring to the accompanying drawings wherein similar reference characters designate similar parts throughout, the improved bobbin consists of an elongated body 10 of generally cylindrical shape having one end pointed as indicated at 11 and the other end recessed to provide a chamber 12 therein. The chamber is preferably arranged co-axially with the length of the body. This chamber is designed to receive a spool of thread indicated at S which conventionally has an axial hole H through its spool. The end of the recess or chamber 12 has a protuberance 13 conically formed and which is adapted to partially enter the forward end of the hole H. The chamber 12 is closed by means of a plug or stopper 14 formed of resilient material such as cork or rubber and having a conical forward end 15 that provides a protuberance adapted to enter the other end of the hole H. The two protuberances 13 and 15 thus provide centers for supporting the spool S for rotation within the chamber. However, as the plug or stopper 14 is formed of resilient material it supplies a considerable frictional resistance to rotation of the spool. By forcing the plug or stopper 14 inwardly into the chamber 12 this resistance may be increased and may be so great that it is impossible to rotate the spool S. By loosening or backing the plug or stopper out of the chamber this resistance may be decreased so that the spool may be rotated quite readily. In this manner by adjusting the plug in or out of the chamber any desired frictional drag may be applied to the spool to resist its rotation. To facilitate this adjustment the exterior of the plug is made cylindrical or substantially so to enable in and out adjustment without involving a loosening of the plug within the end of the chamber.

In the walls of the chamber there is formed an aperture 16 through which the thread on the spool may be withdrawn. The pointed end 11 is somewhat thickened adjacent the point and an inclined bore 17 extends through this thickened portion terminating at one end on the point and at the other end approximately flush with the conically shaped end surface of the bobbin. The withdrawn end of the thread is trained through the aperture 16 and along the exterior of the body and through the inclined bore 17 so that the end of the thread is dispensed at the center of the pointed end.

In the course of tying a fly or other fish lure the plug 14 may be so adjusted as to impose only a slight drag on the spool. As the thread is wound about the lure it is withdrawn from the spool through the opening 16 and passes through the bore 17 being dispensed at the point. The bobbin which is thus manipulated can accurately position the thread as it is dispensed from the point around the lure.

In many situations it is desired to interrupt the winding or tying of the thread and under such circumstances the bobbin may be allowed to remain suspended from the partially wound-on thread. The frictional resistance to the rotation of the spool is normally adequate to prevent its continued unwinding even if the bobbin is completely suspended therefrom. Under these circumstances the bobbin may be suspended from the lure by the dispensed portion of the thread during the period of interruption and the weight of the bobbin will cause a tension to be continuously applied to the wound portion of the thread until winding or tying operations are resumed. Where threads of several colors are used on the same fly a bobbin with one color thread may be left suspended while another bobbin containing another color of thread is being used. When operations are resumed the bobbin may merely be drawn from the thread thus overcoming the frictional resistance applied to the spool and as the winding is continued the tension on the thread is maintained substantially constant.

The body of the bobbin may be formed of any suitable material although a synthetic resin plastic is preferred. It will be appreciated that the bobbin is of relatively simple construction and can be advantageously employed in tying flies. Whenever the spool has become exhausted it can be easily and quickly replaced with a new spool and the withdrawn portion of the thread threaded or trained through the aperture 16 and the bore 17.

Various changes may be made in the details of construction without departing from the spirit and scope of the invention as defined by the appended claims.

I claim:

1. A fly tier's bobbin comprising an elongated body having one end pointed and the other end recessed providing a chamber adapted to receive a spool of thread, there being a protuberance in the end of the recess adapted to enter one end of the hole in the spool, and a closure for the recess having a protuberance adapted to enter the other end of the hole in the spool, said closure being formed of resilient material and being adjustable toward and away from the first protuberance whereby variable frictional resistance to rotation of the spool may be applied, and means for leading the withdrawn end of the thread to the pointed end of the body.

2. A fly tier's bobbin comprising an elongated body having one end pointed and the other end recessed providing a chamber adapted to receive a spool of thread, there being a protuberance at the inner end of the recess adapted to enter one end of the hole in the spool to center the spool in the recess and support it for rotation, a closure adjustably receivable in the other end of the recess having a protuberance adapted to enter the other end of the hole in the spool, there being an aperture in the wall of the recess through which thread on the spool may be withdrawn, there being a passage on the body leading toward the pointed end thereof through which the thread may be trained.

HOBERT R. ZARRS.

REFERENCES CITED

The following references are of record in the file of this patent:

UNITED STATES PATENTS

| Number | Name | Date |
| --- | --- | --- |
| 919,210 | Poulsen | Apr. 20, 1909 |
| 1,148,209 | Arnold | July 27, 1915 |
| 2,338,353 | Perkins | Jan. 4, 1944 |

FOREIGN PATENTS

| Number | Country | Date |
| --- | --- | --- |
| 553,251 | Great Britain | May 13, 1943 |